US 6,615,200 B1
Kayahara
Sep. 2, 2003

(54) INFORMATION-RETRIEVAL-PERFORMANCE EVALUATING METHOD, INFORMATION-RETRIEVAL-PERFORMANCE EVALUATING APPARATUS, AND STORAGE MEDIUM CONTAINING INFORMATION-RETRIEVAL-PERFORMANCE-RETRIEVAL-EVALUATION PROCESSING PROGRAM

(75) Inventor: Naoki Kayahara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/533,100

(22) Filed: Mar. 22, 2000

(30) Foreign Application Priority Data

Mar. 23, 1999 (JP) .......................................... 11-077896

(51) Int. Cl.⁷ .............................................. G06F 17/30
(52) U.S. Cl. .......................................................... 707/2
(58) Field of Search ............................................. 707/2

(56) References Cited

U.S. PATENT DOCUMENTS

| 5,294,229 A | * | 3/1994 | Hartzell et al. ............. 434/336 |
| 5,696,962 A | * | 12/1997 | Kupiec ........................... 704/9 |
| 5,754,938 A | * | 5/1998 | Herz et al. ................... 725/116 |
| 5,794,050 A | * | 8/1998 | Dahlgren et al. ........... 717/114 |
| 5,826,261 A | * | 10/1998 | Spencer ......................... 707/5 |
| 5,855,015 A | * | 12/1998 | Shoham .......................... 707/5 |
| 5,924,105 A | * | 7/1999 | Punch et al. ................ 707/513 |
| 5,950,196 A | * | 9/1999 | Pyreddy et al. ................. 707/5 |
| 5,963,940 A | * | 10/1999 | Liddy et al. .................... 704/9 |
| 6,078,914 A | * | 6/2000 | Redfern .......................... 707/2 |
| 6,167,368 A | * | 12/2000 | Wacholder ...................... 704/9 |
| 6,249,769 B1 | * | 6/2001 | Ruffin et al. .................. 705/10 |
| 6,266,668 B1 | * | 7/2001 | Vanderveldt et al. ......... 706/15 |
| 6,275,820 B1 | * | 8/2001 | Navin-Chandra et al. ..... 707/10 |
| 6,289,342 B1 | * | 9/2001 | Lawrence et al. .............. 707/7 |
| 6,366,683 B1 | * | 4/2002 | Langlotz ...................... 382/128 |
| 6,370,527 B1 | * | 4/2002 | Singhal .......................... 707/6 |

* cited by examiner

Primary Examiner—Wayne Amsbury
(74) Attorney, Agent, or Firm—Oliff & Berridge, PLC

(57) ABSTRACT

The invention concerns quantitatively evaluating retrieval performance of retrieving systems that allow information retrieval when natural sentences are input as retrieval requests. Text and a title (heading) thereof are recognized as a pair of documents, and multiple documents individually having the texts and the headings are prepared as retrieval-target documents. In this, for example, each of the headings is used as contents of a retrieval request, and each of the texts is used as retrieval-target information. One of the headings is input to a retrieving device, and retrieving processing is performed, results of retrieval performed ranked for the headings according to the above, and retrieval-process evaluation is performed according to the ranks. The same processing is repeated for the following headings, and total retrieval processing is performed for the retrieving system according to the individual results of retrieval.

20 Claims, 3 Drawing Sheets

| HEADING RANKING | Q1 | Q2 | Q3 | Q4 | Q5 |
|---|---|---|---|---|---|
| 1 | D1 | D7 | D3 | D2 | D5 |
| 2 | D4 | D2 | D7 | D9 | D6 |
| 3 | D3 | D5 | D2 | D4 | D8 |
| ⋮ | ⋮ | ⋮ | ⋮ | ⋮ | ⋮ |
| 10 | D6 | D1 | D10 | D1 | D3 |

Fig. 4

| HEADING | Q1 | Q2 | Q3 | Q4 | Q5 | TOTAL SCORES |
|---|---|---|---|---|---|---|
| SCORE | 10 POINTS | 9 POINTS | 10 POINTS | 8 POINTS | 10 POINTS | 47 POINTS |

Fig. 5

|  | Q1 | Q2 | Q3 | Q4 | Q5 | TOTAL SCORES |
|---|---|---|---|---|---|---|
| RETRIEVAL SYSTEM ST1 | 10 | 9 | 10 | 8 | 10 | 47 |
| RETRIEVAL SYSTEM ST2 | 8 | 10 | 8 | 9 | 7 | 42 |
| RETRIEVAL SYSTEM ST3 | 9 | 10 | 10 | 7 | 8 | 44 |

Fig. 6

INFORMATION-RETRIEVAL-PERFORMANCE EVALUATING METHOD, INFORMATION-RETRIEVAL-PERFORMANCE EVALUATING APPARATUS, AND STORAGE MEDIUM CONTAINING INFORMATION-RETRIEVAL-PERFORMANCE-RETRIEVAL-EVALUATION PROCESSING PROGRAM

BACKGROUND OF THE INVENTION

1. Field of Invention

The present invention relates to an information-retrieval-performance evaluating method, an information-retrieval-performance evaluating apparatus, and a storage medium containing an information-retrieval-performance-evaluation processing program for automatically and quantitatively evaluating retrieval performance of retrieving systems.

2. Description of Related Art

As retrieval processing for retrieving desired information from a large amount of information, mainly, a very short keyword is inputted as a retrieval request, and a document or documents containing the keyword are output as a retrieval result. This method is used very widely. Hereinbelow, the method of this type is referred to as "keyword-oriented information retrieval".

Recently, however, a retrieval method of a different type has appeared. The method performs not only the keyword-oriented information retrieval, but also information retrieval by allowing input of a so-called "natural sentence" composed of a character string longer than the keyword referred to here. Hereinbelow, the method of this type is referred to as "natural-sentence-oriented information retrieval".

The keyword-oriented information retrieval allows a user to input a keyword as a retrieval request, thereby retrieving information containing the keyword from a large amount of information stored in a database and outputting it. On the other hand, the natural-sentence-oriented information retrieval allows a user to input a natural sentence as a retrieval request, thereby searching for a document containing contents conceptually close to the natural sentence and, if any, outputting the document as a retrieval result.

Whichever the retrieval type, that is, the keyword-oriented information retrieval or the natural-sentence-oriented information retrieval, is used, it is required to retrieve appropriate information in response to an inputted retrieval request. As a tendency in the future, the keyword-oriented information retrieval is considered to be widely used as it has been used, but the natural-sentence-oriented information retrieval is considered to attract attention even more widely. Hereinbelow, when the terminology "information retrieval processing" is used simply or without specific modifiers, it refers to information retrieval processing that is considerably close to the natural-sentence-oriented information retrieval.

At present, there are various retrieving systems that implement information retrieval processing, as described above. However, difficulties arise in judging whether the existing retrieving systems can really produce appropriate outputs in compliance with retrieval requests made by users. That is, this implies that quantitative evaluation of performance of the retrieving systems is difficult.

A reason for the difficulty is that either a concept representing a natural sentence that a user inputs or a concept that represents a document to be retrieved according to the input, cannot be uniquely defined, and appropriateness of documents for the natural sentence must be finally determined by the user.

Under these circumstances, for retrieval performance evaluation of retrieving systems, the only way has been such as that a user checks a retrieval result produced according to a retrieval request (natural sentence) to check a degree with which the user can agree for conformity to the retrieval request that the user has input.

A typical conventional example method that performs retrieval-performance evaluation of retrieving systems is introduced below. The method is such that a plurality of completely independent retrieval requests are prepared for a plurality of retrieval-target documents, a human determines the degree of similarity of the retrieval-target documents to the individual retrieval requests according to the correlation therebetween, determines a document corresponding to a right answer of a retrieval result in compliance with one of the retrieval requests, actually subjects to retrieval, and evaluates the retrieving system according to retrieval results.

To determine an evaluation criterion in the above conventional method, however, the human must carry out various tasks, such as a task to determine the degree of similarity of the retrieval-target documents to the individual retrieval requests according to the correlation therebetween, and a task to determine a document corresponding to a right answer as a retrieval result in compliance with one of the degree of similarity of documents for the retrieval request. Also, the method causes problems in that when a completely independent document is correlated to a retrieval request, the result is apt to be subjective, in which the evaluation criterion may be inappropriate.

SUMMARY OF THE INVENTION

Accordingly, the present invention allows an appropriate evaluation criterion for performing retrieval-performance evaluation of information-retrieval processing systems to be determined simply, thereby enabling an appropriate retrieval-performance evaluation to be implemented.

To achieve the above, an information-retrieval-performance evaluating method of the present invention is arranged such that a text and a title (heading) of the text is recognized as a pair of documents, a document having the text and the title is prepared, one of the text and the title is used as a retrieval request, the other one is used as a retrieval-target information, and retrieval-performance evaluation is performed for a retrieving system according to a result of retrieval performed in response to the retrieval request input.

Also, an information-retrieval-performance evaluating apparatus of the present invention is arranged such that a text and a title of the text is recognized as a pair of documents, a document having the text and the title is prepared, one of the text and the title is used as a retrieval request, the other one is used as a retrieval-target information, and retrieval-performance evaluation is performed for a retrieving system according to a result of retrieval performed in response to the retrieval request input. The information-retrieval-performance evaluating apparatus may be configured as a storage device for storing the retrieval-target information, a retrieving device for performing retrieval based according to the retrieval request from the storage device in response to the retrieval request input, and a retrieval-result evaluating device for performing the retrieval-performance evaluation for the retrieving system according to a result of retrieval performed by the retrieving device.

Also, a storage medium of the present invention contains an information-retrieval-performance-evaluation processing program with which a text and a title of the text is recognized as a pair of documents, a document having the text and the title is prepared, one of the text and the title is used as a retrieval request, the other one is used as a retrieval-target information, and retrieval-performance evaluation is performed for a retrieving system according to a result of retrieval performed in response to the retrieval request input. The information-retrieval-performance-evaluation processing program includes an outputting step for outputting information paired with the retrieval request as a result of retrieval in response to the retrieval request input, and a step for performing the retrieval-performance evaluation of the retrieving system according to the result of retrieval performed by the outputting step.

According to the individual aspects of the present invention, a determination is made whether retrieval-target information paired with the retrieval request therefor exists in the result of retrieval performed according to one of the title and the text, which was input as the retrieval request. When retrieval-target information paired with the retrieval request exists, the retrieval-performance evaluation is performed for the retrieving system according to a condition where the retrieval-target information paired with the retrieval request exists in the result of retrieval.

Also, processing of the retrieval-result evaluation is arranged to retrieve multiple items of information according to the retrieval request, ranks the individual results of retrieval according to the degree of conformity to the retrieval request, and performs the retrieval-performance evaluation for the retrieving system according to the ranks, the retrieval-result evaluation being performed according to the condition where the retrieval-target information paired with the retrieval request exists in the result of retrieval when the retrieval-target information paired with the retrieval request exists.

Also, an arrangement may be such that multiple documents having the text and the title thereof are prepared, the retrieval request is assigned one by one, and results of retrieval for the individual retrieval requests are totaled, thereby performing the retrieval-performance evaluation.

When a retrieval request is issued to a retrieving system, the present invention allows quantitative evaluation to be performed as to whether appropriate information is retrieved for the retrieval request. To achieve this, the present invention is arranged such that, when the document having the text and the title of the text is prepared as the retrieval-target document, one of the title and the text is used as the retrieval request, the other one of the title and the heading is used as retrieval-target information, and the retrieval request is input, the present invention evaluates retrieval performance of the retrieving system by checking the type of information retrieved thereby.

For example, a newspaper has a heading and a text for the heading. The heading summarizes contents of the text to be concise, and if the title is input, and the text paired with the heading is retrieved, appropriate retrieval processing has been performed.

In this way, according to the present invention, when one of the title and the text is used as the retrieval request, the other one of the text and the title is used as the retrieval-target information, evaluation is performed for retrieval performance of the retrieving system. Therefore, retrieval performance of individual retrieving systems can be evaluated precisely and quantitatively.

According to the evaluation method, for example, if a title is used as the retrieval request, multiple items of information are retrieved according to the title, the retrieval results are ranked based on the degree of conformity to the title input, and retrieval-process evaluation is performed for the retrieving system according to the ranks. Accordingly, retrieval-performance evaluation of the retrieving system can be performed quantitatively. When this is implemented for individual retrieving systems, comparison can also be performed easily for the individual retrieving systems.

Furthermore, by preparing multiple documents having a title, multiple retrieval processes can be tried in a single retrieving system so as to totally check the results of retrieval in the individual retrieving systems, thereby allowing retrieval-performance evaluation to be performed even more suitably for the retrieving systems.

BRIEF DESCRIPTION OF THE DRAWINGS

FIG. 4 is a view showing an example list of retrieval results for headings Q1 to Q5 as retrieval requests in a retrieving system ST1;

FIG. 5 is a view showing retrieval results of results of retrieval for the headings Q1 to Q5 as retrieval requests in the retrieving system ST1; and FIG. 6 is a view showing retrieval results of results of retrieval for the headings Q1 to Q5 as retrieval requests in retrieving systems ST1, ST2, and ST3.

DETAILED DESCRIPTION OF PREFERRED EMBODIMENTS

Hereinbelow, an embodiment of the present invention is described. The description of the embodiment covers an information-retrieval-performance evaluating method, an information-retrieval-performance evaluating apparatus of the present invention, and in addition, detailed processing to be performed by an information-retrieval-performance-evaluation processing program contained in a storage medium of the present invention.

The present invention evaluates a retrieving system for a degree of appropriateness of a document subjected to retrieval by the retrieving system in response to a retrieval request (natural sentence) input by a user. To start with, a document having text and a title thereof is prepared, and evaluation is performed, for example, by checking conditions in which retrieval is performed for the text in response to input of the title.

For example, in case of newspapers, text of an article is given a title (which is referred to as a "heading", hereinbelow) concisely summarizing contents of the text in. The heading can be a short sentence (natural sentence) that a writer, or the like, who created the text, figured out so as to quickly convey a summary of contents of the text to readers.

The text and the heading are recognized as a pair. When the heading is inputted as a retrieval request, and in response thereto, the paired text is retrieved. The retrieval can be determined as preferable retrieval.

Following the above, many pairs of headings and texts are prepared and stored in a database, and a heading is inputted as a retrieval request to check the type of documents (texts) retrieved therefrom. By this, retrieval performance of a retrieving system can be considered to be evaluated. Hereinbelow, a description will be given with reference to a particular example.

Figures 1, 2:
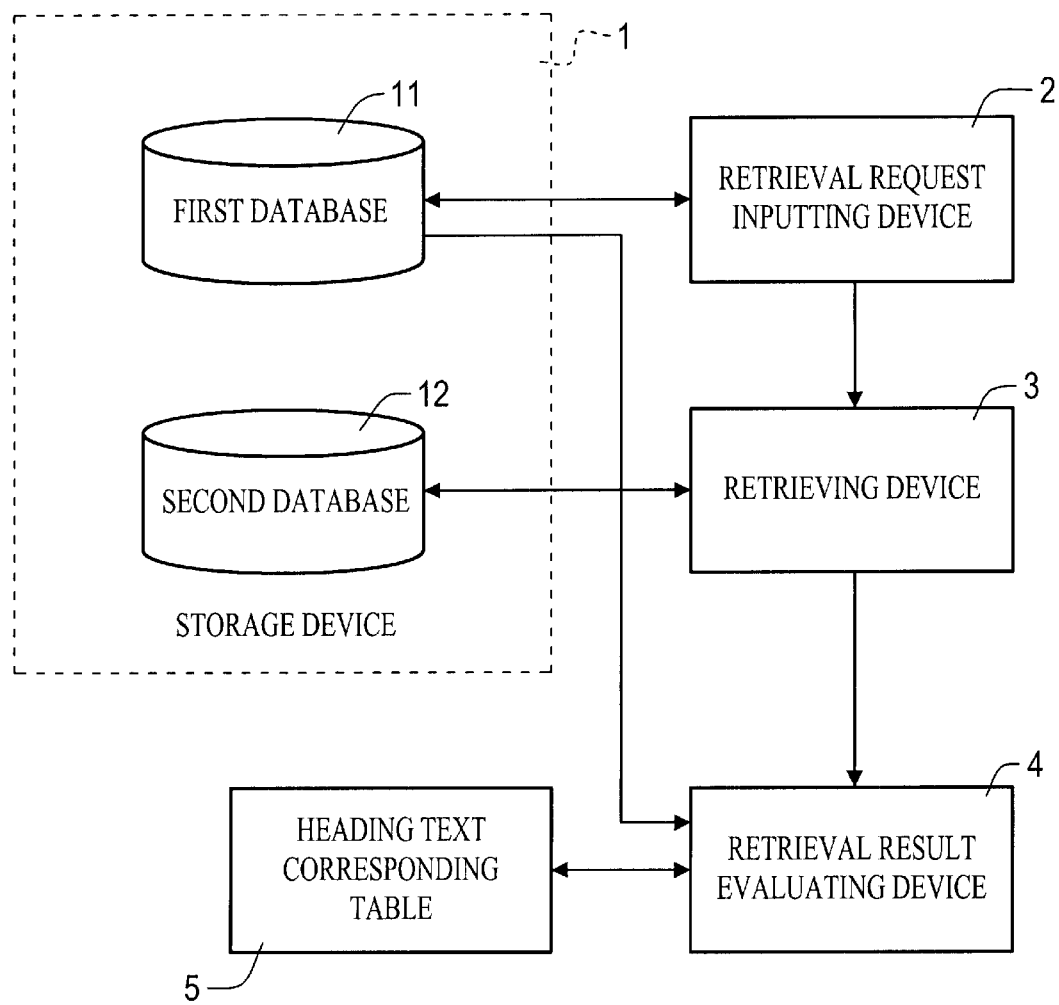
FIG. 1 is a view showing a configuration of an information-retrieval-performance evaluating apparatus according to an embodiment of the present invention.
FIG. 2 is a table of correlations between headings and texts thereof of newspapers, which are used in the embodiment.

FIG. 1 is view showing a configuration of an information-retrieval-performance evaluating apparatus in a retrieving system according to the present invention. A storing device 1 has a database 11 (which is referred to as a "first database", hereinbelow) containing many headings Q1, Q2, Q3, . . . , and Qn. It also has a database 12 (which is referred to as a "second database", hereinbelow) containing texts D1, D2, D3, . . . , and Dn individually paired with the headings, that is, as in the way where the text D1 is paired with the heading Q1, the text D2 is paired with the heading Q2, and the text Dn is paired with the heading Qn.

Also, a retrieval-request inputting device 2 extracts a predetermined heading from the first database 11, and sends the heading to a retrieving device 3 as a retrieval request. Upon receipt of the retrieval request (extracted heading), the retrieving device 3 retrieves information from the second database 12 according to the heading, and sends the retrieval result to a retrieval-result evaluating device 4.

The retrieval-result evaluating device 4 evaluates whether the retrieval result obtained by the retrieving device 3 is appropriate. At this time, it accesses a heading-text correspondence table 5 to find a text paired with the given retrieval request (heading), thereby evaluating whether or not the retrieval result is appropriate to the retrieval request. A method of the evaluation is described below in detail.

FIG. 2 shows an example of the heading-text corresponding table 5. In this example, headings are correlated with texts as in the way where the heading Q1 is correlated with the text D1, the heading Q2 is correlated with the text D2, the heading Q3 is correlated with the text D3, and the heading Qn is correlated with the text Dn.

Figure 3:
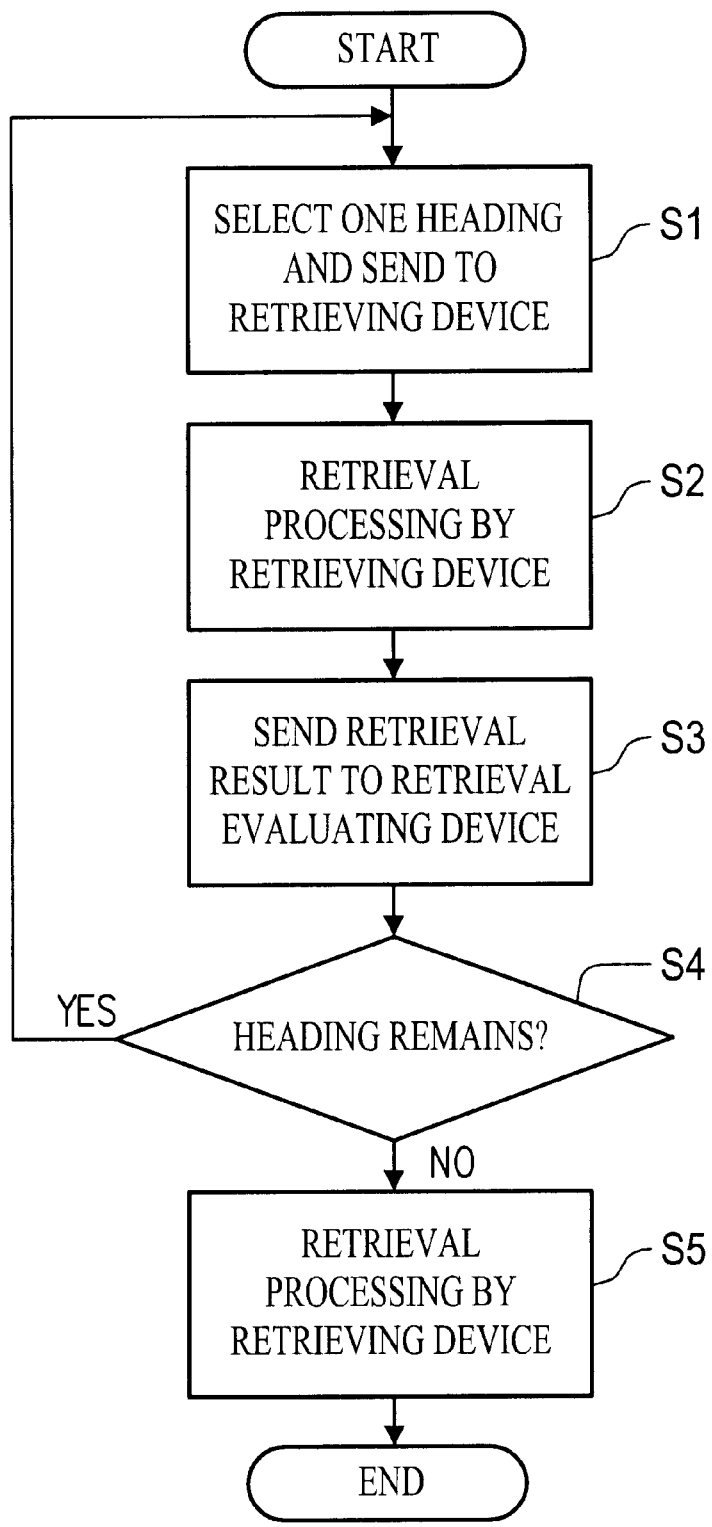
FIG. 3 is a flowchart of retrieval-performance evaluation processing steps to be performed by the embodiment of the present invention.

FIG. 3 is a flowchart showing processing steps according to the present invention. Hereinbelow, processing is described in detail with reference to the flowchart.

First of all, the retrieval-request inputting device 2 extracts one heading Q1, from the first database 11, and sends it to the retrieving device 3 (step s1). Using the heading Q1, the retrieving device 3 retrieves information from the second database 12 (step s2). In this step, in response to the heading Q1, the retrieving device 3 extracts multiple items of information which conform to contents of the heading Q1 in the order of ranks in conformity degree.

For example, for contents of the heading Q1, the text D1 is determined to be in the highest rank in the conformity rank, therefore being extracted as the first rank. The text D4 is determined to be in the second highest rank, therefore being extracted as the second rank, and the text D3 is determined to be in the third highest rank, and therefore being extracted as the third rank. In this way, texts are assumed to be extracted until a predetermined rank (up to the m-Th ranks) is determined.

Subsequently, the retrieval results up to the m-Th rank are sent to the retrieval-result evaluating device 4 (step s3). Then, checking is performed as to whether a heading to be processed remains (step s4). If a heading is found to remain, processing control returns to step s1 so as to extract the next heading.

To simplify description, the embodiment is assumed to sequentially extract headings in the order of the heading numbers as in the way where the heading Q1 is first extracted, the heading Q2 is then extracted, and the heading Q3 is then extracted. Also, the number of headings to be processed may be arranged to be all headings existing in the first database 11 (in this particular case, as all heading, the headings Q1 to Qn exist.). As an alternative arrangement, however, the number of headings to be processed may be predetermined. For example, to simplify the description of the embodiment, five headings (headings Q1 to Q5) are assumed to be processed. In addition, in this embodiment, ranks in the conformity degree are assumed to be in the range from the first rank to the 10th rank, and extraction is performed to cover the ranks up to the 10th rank.

Referring back to the flowchart in FIG. 3, if a current object to be processed is the heading Q1, the embodiment determines that a heading remains to be processed. Therefore, the retrieval-request inputting device 2 extracts a heading to be processed next (which is the heading Q2 in this embodiment), sends the extracted heading to the retrieving device 3, and retrieval is performed according to the heading Q2. According to this, the retrieving device 3 extracts multiple items of information which conform to contents of the heading Q2 for the heading Q2 in the order of ranks in conformity degree.

For example, for contents of the heading Q2, the text D7 is determined to be in the highest rank in the conformity rank, therefore being extracted as the first rank. The text D2 is determined to be in the second highest rank, therefore being extracted as the second rank, and the text D5 is determined to be in the third highest rank, and therefore being extracted as the third rank. In this way, texts are assumed to be extracted until the predetermined rank (up to the 10th ranks) is determined.

Processing as described above is repeated for the headings up to the heading Q5. A list of the retrieval results obtained as described above is shown in FIG. 4. If a retrieving system ST1 is assumed to be a current retrieving system being evaluated, the list of the retrieval results is assumed to show retrieval results of the retrieving system ST1.

In FIG. 4, careful viewing the individual results retrieved as the first rank for the headings Q1 to Q5 discloses the following facts. The retrieving system ST1 retrieved the text D1 as the first rank for the heading Q1, the text D7 as the first rank for the heading Q2, the text D3 as the first rank for the heading Q3, the text D2 as the first rank for the heading Q4, and the text D5 as the first rank for the heading Q5.

The retrieval-result evaluating device 4 accesses the heading-text corresponding table, as shown FIG. 2, and checks correlation between headings and texts, thereby performing evaluation and outputting retrieval results (step s5). For example, when the heading Q1 is used as a retrieval request, the retrieval-result evaluating device 4 determines condition in which the text D1 paired with the heading Q1, and evaluates retrieval performance of the retrieving system.

In the list of the retrieval results, as shown in FIG. 4, for the headings Q1, Q3, and Q5, texts D1, D3, and D5 paired with the headings, respectively, were retrieved as the first rank. However, for the heading Q2, the text D2 paired with the heading was retrieved as the second rank, and for the heading Q4, the text D4 paired with the heading was retrieved as the third rank.

According to these retrieval results, it is obvious that when the headings Q2 and Q4 were used as retrieval requests, the texts D2 and D4 paired with these headings were not retrieved as the first rank. However, as a determination with all the objects to be processed for the headings Q1 to Q5, the total retrieving system ST1 can be determined to perform appropriate retrieval processing.

The list of the retrieval results obtained as described above allows objective evaluation results to be output in response to the evaluation processing. To present evaluation results, various ways can be considered, and one example is described below.

For example, suppose a text retrieved as the first rank for a heading used as a retrieval request is paired with the heading. That is, the text D1 is retrieved as the first rank for the heading Q1 used as a retrieval request. In this case, scoring points corresponding to ranks may be predetermined in a manner such as that, when the text D1 is retrieved as the first rank for the heading Q1, 10 points are given. When the text D1 is retrieved as the second rank for the heading Q1, 9 points are given, and when the text D1 is retrieved as the third rank for the heading Q1, 8 points are given. The total score of these points can be used as an evaluation result for the system.

As one example, the above manner is applied to the case shown in the list of the retrieval results in FIG. 4. In this case, as shown in FIG. 5, 10 points can be given for the heading Q1, 9 points can be given for the heading Q2, 8 points can be given for the heading Q4, and 10 points can be given for the heading Q5. Then, total scores are figured out for all the individual headings Q1 to Q5 that are to be processed, and the total scores can be used as evaluation results. As the evaluation results, the points may be used as they are. However, the results may be represented in a form of, for example, evaluation in five grades.

Subsequently, processing as described above is performed for other retrieving systems (which are assumed to be retrieving systems ST2 and ST3), and, as evaluation results, a total score is figured out for each of the retrieving system ST2 and ST3 for all the headings Q1 to Q5 that are to be processed. FIG. 6 shows total scores for the retrieving systems ST1, ST2, and ST3 for all the headings Q1 to Q5 to be processed, and also evaluation results obtained in the manner of totaling the total scores. According to the results, the evaluation result for the retrieving system ST1 can be known to be the highest, that is, higher than those for the other retrieving systems ST2 and ST3. Therefore, it is determined to be the best retrieving system among the three retrieving systems.

As described above, according to this embodiment, the headings Q1 to Q5 are selected as headings to be processed, each of these headings Q1 to Q5 is input to the retrieving system as a retrieval request, and retrieval processing is actually performed according to the retrieval request. Then, checking is performed to identify the type of information (text) actually retrieved.

The above clarifies that, for a heading, i.e., a retrieval request, retrieval of a text paired with the heading is the most preferable retrieval. Therefore, checking is performed to identify the rank with which, for example, the text D1 is retrieved, thereby allowing the retrieving system to be evaluated.

With this embodiment, points corresponding to ranks are given for each of headings as in the way where 10 points are given when retrieval is performed as the first rank for each heading, and 9 points are given when retrieval is performed as the second rank for each heading. Also, the total scores of the above are used as evaluation results, thereby allowing retrieving systems to be objectively evaluated.

The present invention is not restricted to the described embodiment, but it may be implemented with various other modifications made without departing from the scope of the invention. For example, the way to obtain the evaluation result for each retrieving system is not restricted to that in the described embodiment, and various other ways may be used. For example, in the described embodiment, points are given according to a linear variation which is sequential from the first rank. However, the points may be given according to a curvilinear variation weighted so that high ranks are given higher points.

Also, an example arrangement may be such that when the number of headings to be processed is five, as results of retrieval performed for each of the five headings, cases where texts individually paired with the headings are retrieved as the first rank are counted, and retrieval results are obtained from the count values. For example, when five headings exist, and a text is retrieved as the first rank for four of the five headings, the value "4" is used as the evaluation result (the value may be used as is as the evaluation result, but the evaluation result may be presented in other forms based on the value).

Also, an arrangement may be such that probabilities on which texts are retrieved as the first rank are obtained for use as retrieval results. For example, when five headings exist, and a text is retrieved as the first rank for four of the five headings, the probability (80% in this case) on which the text is retrieved as the first rank may be used as the evaluation result. In this case as well, the probability may be used as is as the evaluation value, but the evaluation result may be presented in other forms based on the probability.

Also, an arrangement may be such that a threshold is set for the ranks, and retrieval-performance evaluation for the system is performed according to checking as to whether a heading or headings exist within a range of the threshold. For example, when the threshold is set to the third rank, and a text paired with a heading is retrieved within the third rank, plus-evaluation is performed, whereas no text is retrieved within the third rank, minus evaluation is performed. In this, positive numbers are used as count values, and evaluation is implemented according to the count values. This makes rough evaluation, but is sufficient to know a standard performance of a retrieving system.

As can be understood from the above, various methods for evaluating individual retrieving systems can be considered, and there are no particular restrictions in the form of evaluation.

Also, in the described embodiment, headings are stored in the first database as retrieval requests, texts are stored in the second database as retrieval-target documents, and checking is performed to identify the type of texts retrieved for the headings. However, an arrangement may be such as that, conversely, texts are stored in the first database as retrieval requests, headings are stored in the second database as retrieval-target documents. In this case, a text is input as a retrieval request, checking is performed to identify the type of headings retrieved for the text, and the retrieving system is evaluated according to the check results.

Also, in the described embodiment, in evaluation by the retrieval-result evaluating device 4 for retrieval results, contents of the heading-text correspondence table are referenced to identify a heading currently being processed and a text paired with the heading. However, an arrangement may be such that the table is not referenced, but information on a heading currently being retrieved by the retrieving device 3 is directly received from the retrieving device 3, and information on a text paired with the heading is received directly from the second database. In this case, the table is not necessary.

Also, in the described embodiment, a document paired with a title (heading) is explained with reference to a newspaper article. However, the document is not restricted to the newspaper article, and there are no particular restrictions thereto except for the condition where documents have a pair of text and heading.

Also, in the described embodiment, headings to be used as retrieval requests are stored in the database, and the retrieval-request inputting device 2 extracts the heading one by one from the first database for use as the retrieval request. However, the retrieval requests need not be stored in the database. An arrangement may be such that a human inputs a predetermined retrieval request (referred to as a "heading" in this embodiment) as required, and retrieval processing is performed according to the inputted heading.

Also, the information-retrieval-performance-evaluation processing program for performing processing of the present invention may be stored in an storage medium such as a floppy disk, an optical disk, and a hard disk, and is included in the present invention. Also, an arrangement may be such that the processing program is obtained from a network.

According to the described invention, when a document having a text and a title of the text is prepared as a retrieval-target document, one of the title and the text is used as contents of a retrieval request, the other one of the title and the heading is used as retrieval-target information, and the retrieval request is inputted, evaluation is performed for retrieval performance of a retrieving system by checking the type of information retrieved thereby. For example, a newspaper has a heading and a text for the heading. The heading summarizes contents of the text to be concise, and if the heading is input, and the text paired with the heading is retrieved, appropriate retrieval processing has been performed.

In this way, the present invention avoids various tasks a human must carry out in order to determine evaluation criterion in a conventional case. In the conventional case, for a plurality of some documents, a plurality of retrieval requests are prepared independently thereof, a human determines the degree of similarity of the retrieval-target documents to the individual retrieval requests according to the correlation therebetween, and determines a document corresponding to a right answer as a retrieval result for one of the retrieval requests. In addition, the present invention can quantitatively and appropriately evaluate retrieval performance of individual retrieving systems. According to the evaluation method, for example, if a title is used as the retrieval request, multiple items of information are retrieved according to the title, the retrieval results are ranked based on the degree of conformity to the title input, and retrieval-process evaluation is performed for the retrieving system according to the ranks.

Accordingly, retrieval-performance evaluation of the retrieving system can be performed automatically and quantitatively. When this is implemented for individual retrieving systems, comparison can also be performed easily for the individual retrieving systems. Furthermore, by preparing multiple documents having a title, multiple retrieval processes can be tried in a single retrieving system so as to totally check the results of retrieval in the individual retrieving systems, thereby allowing retrieval-performance evaluation to be performed even more precisely for the retrieving systems.

What is claimed is:

1. An information-retrieval-performance evaluating method for performing an evaluation of an information retrieving system that retrieves documents, the method comprising:

providing a retrieval request comprising either a heading or a text of a document to the information retrieving system, and wherein the other corresponding one of the text and the heading for the document is a retrieval-target information such that when the retrieval request comprises a heading of the document, the retrieval-target information comprises the corresponding text of the document and when the retrieval request comprises a text of the document, the retrieval-target information comprises the corresponding heading of the document;

retrieving one or more texts from a storage device in response to the retrieval request comprised of a heading or retrieving one or more headings from a storage device in response to the retrieval request comprised of a text; and performing a retrieval-performance evaluation to evaluate an accuracy of the information retrieving system in retrieving the retrieval-target information according to a result of the retrieval performed in response to the retrieval request.

2. The information-retrieval-performance evaluating method of claim 1, further comprising:

determining whether the retrieval-target information paired with the retrieval request exists, the determination being part of the result of retrieval performed and evaluated, such that if the retrieval-target information paired with the retrieval request is determined to exist, the retrieval-performance evaluation is performed for the retrieving system according to a condition where the retrieval-target information paired with the retrieval request exists in the retrieval result.

3. The information-retrieval-performance evaluating method of claim 2, the performing the retrieval-result evaluation step including retrieving multiple items of information according to the retrieval request, giving ranks to individual results of the retrieval according to a degree of conformity to the retrieval request, and performing the retrieval-performance evaluation for the information retrieving system according to the ranks, the retrieval-result evaluation being performed according to the condition where the retrieval-target information being paired with the retrieval request exists in the retrieval result.

4. The information-retrieval-performance evaluating method of claim 3, wherein when multiple documents having a text and a heading are stored in the storage device, a retrieval request is provided for each document one by one in the providing step, wherein the results of retrieval for all of the individual retrieval requests are totaled, and wherein the retrieval-performance evaluation is based on the total.

5. The information-retrieval-performance evaluating method of claim 2, wherein when multiple documents having a text and a heading are stored in the storage device, a retrieval request is provided for each document one by one in the providing step, wherein the results of retrieval for all of the individual retrieval requests are totaled, and wherein the retrieval-performance evaluation is based on the total.

6. The information-retrieval-performance evaluating method of claim 1, wherein when multiple documents having a text and a heading are stored in the storage device, a retrieval request is provided for each document one by one in the providing step, wherein the results of retrieval for all of the individual retrieval requests are totaled, and wherein the retrieval-performance evaluation is based on the total.

7. An information-retrieval-performance evaluating apparatus for an information retrieval system that retrieves documents, comprising:

a storage device;

a retrieval-request inputting device that receives a retrieval request comprised of either the text or the heading of a document, wherein the other corresponding one of the text and the heading of the document is a retrieval-target information;

a retrieving device that retrieves one or more texts from the storage device in response to the retrieval request comprised of a heading or that retrieves one or more headings from the storage device in response to the retrieval request comprised of a text, said retrieved items being stored in the storage device; and a retrieval-result evaluating device that performs a retrieval-performance evaluation to evaluate an accuracy of the information retrieving system in accurately retrieving the retrieval-target information corresponding to the retrieval request.

8. The information-retrieval-performance evaluating apparatus of claim 7, the retrieval-result evaluating device determining whether the retrieval-target information paired with the retrieval request exists, the determination being part of the result of retrieval performed and evaluated, such that if the retrieval-target information paired with the retrieval request is determined to exist, the retrieval-performance evaluation is performed for the retrieving system according to a condition where the retrieval-target information paired with the retrieval request exists in the retrieval result.

9. The information-retrieval-performance evaluating apparatus of claim 8, the retrieval-result evaluating device retrieving multiple items of information according to the retrieval request, giving ranks to individual results of the retrieval according to a degree of conformity to the retrieval request, and performing the retrieval-performance evaluation for the information retrieving system according to the ranks, the retrieval-result evaluation being performed according to the condition where the retrieval-target information being paired with the retrieval request exists in the retrieval result.

10. The information-retrieval-performance evaluating apparatus of claim 9, wherein the retrieving device retrieving multiple documents when multiple documents have the text and the title thereof stored in the storage device, wherein a retrieval request is received by the retrieval-request inputting device one by one for each of the multiple documents, wherein the results of retrieval for the individual retrieval requests are totaled, and wherein the retrieval-performance evaluation is based on the total.

11. The information-retrieval-performance evaluating apparatus of claim 8, wherein the retrieving device retrieving multiple documents when multiple documents have the text and the title thereof stored in the storage device, wherein a retrieval request is received by the retrieval-request inputting device one by one for each of the multiple documents, wherein the results of retrieval for the individual retrieval requests are totaled, and wherein the retrieval-performance evaluation is based on the total.

12. The information-retrieval-performance evaluating apparatus of claim 7, wherein the retrieving device retrieving multiple documents when multiple documents have the text and the title thereof stored in the storage device, wherein a retrieval request is received by the retrieval-request inputting device one by one for each of the multiple documents, wherein the results of retrieval for the individual retrieval requests are totaled, and wherein the retrieval-performance evaluation is based on the total.

13. The information-retrieval-performance evaluating apparatus of claim 7, wherein the storage device comprises two databases, one of the databases storing the headings of the documents and the other of the databases storing the texts of the documents.

14. A storage medium that stores programs for performing an evaluation of an information retrieving system that retrieves documents, the storage medium comprising:

a program for receiving a retrieval request comprising either a text or a heading of a document, wherein the other corresponding one of the text and the heading of the document is a retrieval-target information;

a program for retrieving one or more texts or one or more headings from a storage device in response to the retrieval request; and a program for performing a retrieval-performance evaluation to evaluate an accuracy of the information retrieving system in accurately retrieving the retrieval-target information corresponding to the retrieval request.

15. The storage medium of claim 14, further comprising:

a program for determining whether the retrieval-target information paired with the retrieval request exists, the determination being part of the result of retrieval performed and evaluated, such that if the retrieval-target information paired with the retrieval request is determined to exist, the retrieval-performance evaluation is performed for the retrieving system according to a condition where the retrieval-target information paired with the retrieval request exists in the retrieval result.

16. The storage medium of claim 15, the program for performing the retrieval-result evaluation including retrieving multiple items of information according to the retrieval request, giving ranks to individual results of the retrieval according to a degree of conformity to the retrieval request, and performing the retrieval-performance evaluation for the information retrieving system according to the ranks, the retrieval-result evaluation being performed according to the condition where the retrieval-target information being paired with the retrieval request exists in the retrieval result.

17. The storage medium of claim 16, the program for performing a retrieval-performance evaluation including that, when multiple documents having the text and the title thereof are stored in the storage device, a retrieval request is received one by one for each of the multiple documents, the results of retrieval for the individual retrieval requests are totaled, and the retrieval-performance evaluation is based on the total.

18. The storage medium of claim 15, the program for performing a retrieval-performance evaluation including that, when multiple documents having the text and the title thereof are stored in the storage device, a retrieval request is received one by one for each of the multiple documents, the results of retrieval for the individual retrieval requests are totaled, and the retrieval-performance evaluation is based on the total.

19. The storage medium of claim 14, the program for performing a retrieval-performance evaluation including that, when multiple documents having the text and the title thereof are stored in the storage device, a retrieval request is received one by one for each of the multiple documents, the results of retrieval for the individual retrieval requests are totaled, and the retrieval-performance evaluation is based on the total.

20. The storage medium of claim 14, wherein the storage device comprises two databases, one of the databases storing the headings of the documents and the other of the databases storing the texts of the documents.

* * * * *